United States Patent
Luo et al.

(10) Patent No.: US 11,368,901 B2
(45) Date of Patent: Jun. 21, 2022

(54) METHOD FOR IDENTIFYING A TYPE OF A WIRELESS HOTSPOT AND A NETWORK DEVICE THEREOF

(71) Applicant: SHANGHAI LIANSHANG NETWORK TECHNOLOGY CO., LTD., Shanghai (CN)

(72) Inventors: Kun Luo, Shanghai (CN); Zhou Han, Shanghai (CN); Leigen Cheng, Shanghai (CN)

(73) Assignee: SHANGHAI LIANSHANG NETWORK TECHNOLOGY CO., LTD., Shanghai (CN)

(*) Notice: Subject to any disclaimer, the term of this patent is extended or adjusted under 35 U.S.C. 154(b) by 0 days.

(21) Appl. No.: 17/106,189

(22) Filed: Nov. 30, 2020

(65) Prior Publication Data

US 2021/0084574 A1 Mar. 18, 2021

Related U.S. Application Data

(63) Continuation of application No. PCT/CN2019/088297, filed on May 24, 2019.

(30) Foreign Application Priority Data

Jun. 1, 2018 (CN) .......................... 201810557552.0
Jun. 12, 2018 (CN) .......................... 201810600611.8

(51) Int. Cl.
*H04W 48/14* (2009.01)
*H04W 4/029* (2018.01)
*H04W 12/06* (2021.01)

(52) U.S. Cl.
CPC .......... *H04W 48/14* (2013.01); *H04W 4/029* (2018.02); *H04W 12/06* (2013.01)

(58) Field of Classification Search
CPC ............................... H04W 64/00; H04W 12/50
(Continued)

(56) References Cited

U.S. PATENT DOCUMENTS

2016/0055230 A1* 2/2016 Yurchenko .............. G06F 16/27
707/694
2017/0150432 A1* 5/2017 Wang ........................ G06F 7/08
(Continued)

FOREIGN PATENT DOCUMENTS

CN 103533608 A 1/2014
CN 105162768 A 12/2015
(Continued)

*Primary Examiner* — Kiet M Doan
(74) *Attorney, Agent, or Firm* — Kilpatrick Townsend & Stockton, LLP

(57) ABSTRACT

The present application provides a method and a network device for identifying a type of a wireless hotspot. The method comprises: in response to receiving a type determination request for a first wireless hotspot, obtaining information of the first wireless hotspot, wherein the type determination request is configured to request that a type of the first wireless hotspot be provided; searching for a second wireless hotspot which is identical or similar to the first wireless hotspot based on the information of the first wireless hotspot and information of multiple second wireless hotspots in a preset set of hotspots, wherein a type of the second wireless hotspot is an open wireless hotspot with authentication required; and in response to locating a second wireless hotspot which is identical or similar to the first wireless hotspot, identifying the type of the first wireless hotspot as an open wireless hotspot with authentication required.

9 Claims, 1 Drawing Sheet

(58) Field of Classification Search
USPC .......................................... 435/375; 382/149
See application file for complete search history.

(56) References Cited

U.S. PATENT DOCUMENTS

2018/0014243 A1   1/2018  Peng et al.
2020/0187008 A1*  6/2020  Ding .................... H04W 12/50

FOREIGN PATENT DOCUMENTS

| CN | 106162649 A | 11/2016 |
| CN | 106341861 A | 1/2017 |
| CN | 106792704 A | 5/2017 |
| WO | 2017128546 A1 | 8/2017 |

* cited by examiner

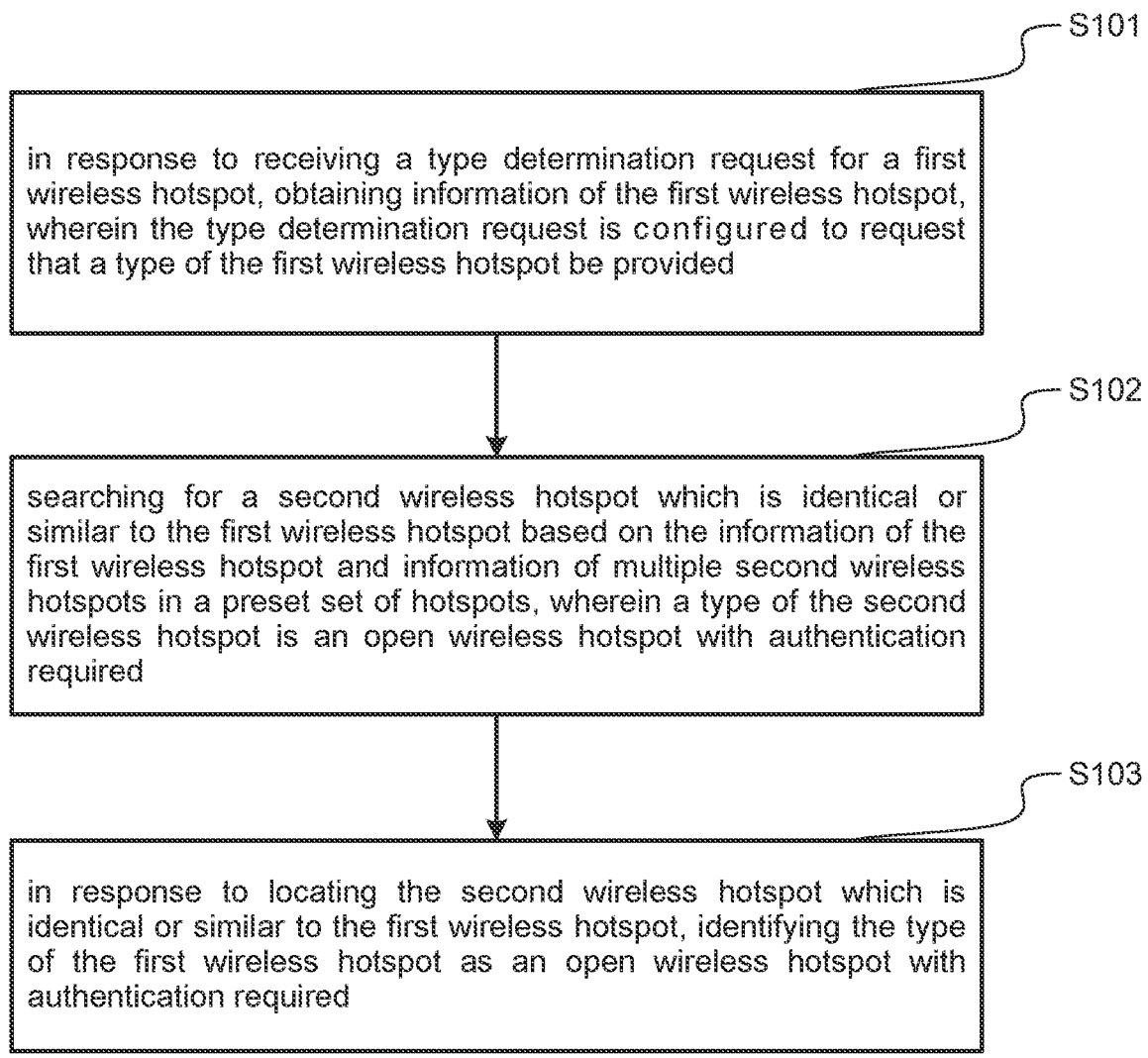

METHOD FOR IDENTIFYING A TYPE OF A WIRELESS HOTSPOT AND A NETWORK DEVICE THEREOF

CROSS REFERENCE TO THE RELATED APPLICATION

This application is the continuation application of International Application No. PCT/CN2019/088297, filed on May 24, 2019, which is based upon and claims priority to Chinese Patent Application No. 201810557552.0, filed on Jun. 1, 2018 and Chinese Patent Application No. 201810600611.8, filed on Jun. 12, 2018, the entire contents of which are incorporated herein by reference.

TECHNICAL FIELD

The present application relates to computers, and more specifically relates to a method for identifying a type of a wireless hotspot and a network device thereof.

BACKGROUND

In the prior art, many open hotspots may be connected after user authentication. For example, a user is not allowed to access the Internet through a wireless hotspot until the user is authenticated by entering information such as a mobile phone number. When a user looks for wireless hotspots nearby, a large number of wireless hotspots around might be found. Wireless hotspots may be roughly divided into encrypted hotspots which require a password to connect and open hotspots which do not require a password to connect. Open hotspots may be further divided into open hotspots which do not require authentication to connect and open hotspots which require authentication to connect. However, it is difficult for a user to determine the type to which a wireless hotspot actually belongs, if no connection operation has not been conducted.

SUMMARY

An objective of the present application is to provide a method for identifying a type of a wireless hotspot and a network device thereof, so as to address problems of determining a type of a wireless hotspot.

According to one aspect of the present application, a method implemented at a network device for identifying a type of a wireless hotspot is provided. The method comprises: in response to receiving a type determination request for a first wireless hotspot, obtaining information of the first wireless hotspot, wherein the type determination request is configured to request that a type of the first wireless hotspot be provided; searching for a second wireless hotspot which is identical or similar to the first wireless hotspot based on the information of the first wireless hotspot and information of multiple second wireless hotspots in a preset set of hotspots, wherein a type of the second wireless hotspot is an open wireless hotspot with authentication required; and in response to locating a second wireless hotspot which is identical or similar to the first wireless hotspot, identifying the type of the first wireless hotspot as an open wireless hotspot with authentication required.

According to another aspect of the present application, a computer-readable storage medium storing instructions is provided. The instructions are executed according to the method described in the present application.

According to yet another aspect of the present application, a network device comprising a processor is provided. The processor executes instructions according to the method described in the present application.

The method for identifying a type of a wireless hotspot and the network device thereof provided in the present application may determine whether a requested wireless hotspot is a wireless hotspot with identity authentication required, according to a type determination request in combination with a set of hotspots preset by the network device.

DESCRIPTIONS OF THE DRAWINGS

Other features, objects, and advantages of the present application will become more apparent by reading the detailed description of non-limiting embodiments with reference to the following drawings:

FIG. 1 shows a schematic flowchart of a method for identifying a type of a wireless hotspot according to embodiments of the present application.

The identical or similar reference numerals in the drawings represent the identical or similar components.

DETAILED EMBODIMENTS

The application is further described in detail below with reference to the accompanying drawings.

In a typical configuration of the present application, terminals and network devices both comprise one or more processors (CPUs), an input/output interface, a network interface and a memory.

The memory may include a memory in form of a non-permanent memory, a random access memory (RAM) and/or a non-volatile memory and the like in a computer-readable medium, such as a read-only memory (ROM) or a flash memory (flashRAM). A memory is an example of a computer-readable medium.

A computer-readable medium comprises permanent and non-permanent, movable and non-movable media and may implement information storage by means of any method or technology. Information may be computer-readable instructions, data structures, program modules or other data. The examples of a computer storage medium include but are not limited to a phase change memory (PRAM), a static random access memory (SRAM), a dynamic random access memory (DRAM), other types of random access memory (RAM), a read-only memory (ROM), an electrically erasable programmable read-only memory (EEPROM), a flash memory or other memory technologies, compact disk read-only memory (CD-ROM), a digital versatile disc (DVD) or other optical storages, a magnetic cassette tape, and magnetic tape and magnetic disk storage or other magnetic storage devices or any other non-transmission media, which can be used to store information that can be accessed by a computing device. According to the definition herein, the computer-readable medium does not include a non-transitory computer-readable medium, such as a modulated data signal and a carrier.

Terminals referred to as in the present invention include but are not limited to any type of electronic products capable of human-machine interaction with users (e.g., via touchpads), for example, mobile electronic products such as a smart phone, a tablet, etc. The mobile electronic products can adopt any operating system, such as android operating system, iOS operating system, etc. Network devices include an electronic device of automatically performing numeral calculations and information processing according to preset or stored instructions. It's hardware includes but is not limited to micro-processors, application specific integrated circuits (ASIC), programmable logic device (PLD), field programmable gate array (FPGA), digital signal processors (DSP), embedded devices, etc. Network devices include but are not limited to: computers, mainframes, single network server, a cloud composed of multiple network server sets or multiple servers. Cloud as used herein is formed by a massive amount of computers or network servers based on cloud computing, wherein cloud computing is a type of distributed computing, which is a virtual super computer composed of a group of loosely coupled computer sets. Networks include but are not limited to internet, Wide Area Network (WAN), Metropolitan Area Network (MAN), Local Area Network (LAN), Virtual Private Network (VPN), wireless ad-hoc network, etc. In one embodiment, the terminals and the network devices may also be programs running on the terminals, the network devices, or devices formed by the integration of terminals and network devices through networks.

FIG. 1 shows a schematic flowchart of a method for identifying a type of a wireless hotspot according to some embodiment of the present application. Steps S101 to S103 shown in FIG. 1 are mainly performed by a network device. As shown in FIG. 1, in an embodiment of the present application, the method for identifying a type of a wireless hotspot comprises:

step S101: in response to receiving a type determination request for a first wireless hotspot, obtaining information of the first wireless hotspot, wherein the type determination request is configured to request that a type of the first wireless hotspot be provided.

The type determination request may come from a terminal or may come from the network device internally. The type of the first wireless hotspot has not been determined, for example, the type has not been determined by a transmitter of the type determination request. For example, a terminal transmits a type determination request. The type determination request carries an identifier of the first wireless hotspot so as to further obtain information of the first wireless hotspot. A name list of first wireless hotspots may also be collected by the network device such as a server so as to determine the type of the first wireless hotspots.

The method comprises: step S102, searching for a second wireless hotspot which is identical or similar to the first wireless hotspot based on the information of the first wireless hotspot and information of multiple second wireless hotspots in a preset set of hotspots, wherein a type of the second wireless hotspot is an open wireless hotspot with authentication required.

The network device may access the preset set of hotspots. The set of hotspots contains information of several second wireless hotspots therein. The second wireless hotspot has been determined as an open wireless hotspot with authentication required. When a user is to connect to an open wireless hotspot with authentication required, the user may access the Internet after authentication, for example, authentication through an authentication page. The network device may add the second wireless hotspot which has been determined as an open hotspot with authentication required into the set of hotspots.

The method comprises: step S103, in response to locating the second wireless hotspot which is identical or similar to the first wireless hotspot, identifying the type of the first wireless hotspot as an open wireless hotspot with authentication required.

The first wireless hotspot which is identical or similar to the second wireless hotspot is also labeled as an open wireless hotspot with authentication required by comparing the information of the first wireless hotspot with the information of the second wireless hotspot. The first wireless hotspot being identical to the second wireless hotspot as used herein refers to that identifiers and physical addresses of the first wireless hotspot and the second wireless hotspot are identical. For example, both the SSIDs and BSSIDs of the first wireless hotspot and the second wireless hotspot are identical. The method for determining whether the first wireless hotspot is similar to the second wireless hotspot will be specifically introduced in the following embodiments.

Whether a wireless hotspot requested by a terminal or a network device is a type of a wireless hotspot with authentication required or a type of wireless hotspot without authentication required is determined through the method of the embodiments of the present application, according to a type determination request from the terminal or the network device in combination with a set of hotspots of the network device.

In some embodiments of the present application, the type determination request comes from a terminal, and the type determination request comprises an identifier of the first wireless hotspot scanned by the terminal. In the embodiments, the method further comprises the following steps: in response to the type of the first wireless hotspot being identified as an open wireless hotspot with authentication required, feeding identification information of the first wireless hotspot and a tag corresponding to the identification information back to the terminal, wherein the tag is configured to indicate that the type of the first wireless hotspot is an open wireless hotspot with authentication required.

An application running on the terminal may transmit a type determination request to a network device. The type determination request carries an identifier of the first wireless hotspot to request whether any of the first wireless hotspots is an open wireless hotspot with authentication required be determined. The network device determines whether the first wireless hotspot is identical or similar to the second wireless hotspot according to the identifier of the first wireless hotspot and other related information, such as location information, a provider source field, etc., of the first wireless hotspot. When the first wireless hotspot is identical or similar to the second wireless hotspot, the first wireless hotspot is regarded as an open wireless hotspot with authentication required. The network device feeds the identification information of the first wireless hotspot and a tag corresponding to the identification information back to the terminal. The tag indicates that the type of the first wireless hotspot is an open wireless hotspot with authentication required. In some embodiments, the type determination request transmitted by the application running on the terminal to the network device may comprise a request for acquiring hotspot information transmitted by the terminal to the network device. The request for acquiring hotspot information is configured to request, from the network device, information of a wireless hotspot scanned by the terminal. In some embodiments, the request for acquiring hotspot information may comprise identifiers, such as SSIDs, of the wireless hotspots scanned by the terminal, and may be configured to request the network device to provide the type of the wireless hotspots and a password of an encrypted hotspot from the scanned wireless hotspots. In some embodiments, since the terminal is able to determine whether the scanned wireless hotspot is an encrypted hotspot or an open hotspot, but is unable to determine whether authentication is required to connect to an open hotspot, the above-mentioned type determination request may be mainly configured to request the network device to feedback a type of an open hotspot.

In some embodiments of the present application, before obtaining the information of the first wireless hotspot, the method in the embodiments further comprises: obtaining connection data from the terminal which is generated based on an connection operation on the second wireless hotspot by the terminal; in response to the connection data indicating that authentication is required to connect to the second wireless hotspot, identifying the type of the second wireless hotspot as an open wireless hotspot with authentication required, and adding the second wireless hotspot into the set of hotspots.

In some embodiments, an application installed on the terminal may detect the connection data generated based on a connection operation for connecting to the wireless hotspot by a user. When it is found that authentication data such as an authentication page is generated when connecting to a wireless hotspot, the wireless hotspot is identified as an open wireless hotspot with authentication required, i.e., a second wireless hotspot. Thus identification result is reported to the network device, such that the network device adds information of the second wireless hotspot into the set of hotspots. In some embodiments, the application may transmit the connection data generated based on the connection operation on the second wireless hotspot to the network device through the terminal. The network device identifies the type of the second wireless hotspot as an open wireless hotspot with authentication required in response to the connection data indicating that authentication is required to connect to the second wireless hotspot, and adds the second wireless hotspot into the set of hotspots.

Specifically, the information of the first wireless hotspot or the second wireless hotspot comprises at least one of: an identifier of the first wireless hotspot or the second wireless hotspot; location information of the first wireless hotspot or the second wireless hotspot; a provider source field of the first wireless hotspot or the second wireless hotspot. In some embodiments, the identifier may comprise SSID (Service Set Identifier); the location information may comprise a hash code of a geographic location (geohash); the provider source field may comprise the first six bits of BSSID (Basic Service Set Identifier).

Accordingly, in some embodiments of the present application, the second wireless hotspot being similar to the first wireless hotspot comprises: a second wireless hotspot with an identifier identical to that of the first wireless hotspot and with a provider source field identical or similar to that of the first wireless hotspot; or a second wireless hotspot with an identifier identical to that of the first wireless hotspot and with location information indicating that the second wireless hotspot is in a same area as the first wireless hotspot; or a second wireless hotspot with an identifier similar to that of the first wireless hotspot and with location information indicating that the second wireless hotspot is in a same area as the first wireless hotspot.

In some embodiments, when the identifier of the second wireless hotspot is identical to the identifier of the first wireless hotspot and the provider source field of the second wireless hotspot is identical or similar to the provider source field of the first wireless hotspot, it may be determined that the second wireless hotspot is similar to the first wireless hotspot. For example, the type determination request contains the SSID and BSSID of the first wireless hotspot. The network device queries the SSID and BSSID of the second wireless hotspot in a preset set of hotspots. When the SSID of the second wireless hotspot is identical to the SSID of the first wireless hotspot and the first six bits of the BSSID of the second wireless hotspot is identical to the first six bits of the BSSID of the first wireless hotspot, it is determined that the second wireless hotspot is similar to the first wireless hotspot.

In some embodiments, when the identifier of the second wireless hotspot is identical to the identifier of the first wireless hotspot and the location information of the second wireless hotspot and the first wireless hotspot indicates that they are in the same area, it may be determined that the second wireless hotspot is similar to the first wireless hotspot. For example, the type determination request contains the SSID and the location information of the first wireless hotspot. The network device queries the SSID and the location information of the second wireless hotspot in the preset set of hotspots. When the SSID of the second wireless hotspot is identical to the SSID of the first wireless hotspot and the location information of the second wireless hotspot and the first wireless hotspot indicates that they are in the same area, it is determined that the second wireless hotspot is similar to the first wireless hotspot.

In some embodiments, when the identifier of the second wireless hotspot is similar to the identifier of the first wireless hotspot and the location information of the second wireless hotspot and the first wireless hotspot indicates that they are in the same area, it may be determined that the second wireless hotspot is similar to the first wireless hotspot. For example, the type determination request contains the SSID and the location information of the first wireless hotspot. The network device queries the SSID and the location information of the second wireless hotspot in the preset set of hotspots. When the SSID of the second wireless hotspot is similar to the SSID of the first wireless hotspot and the location information of the second wireless hotspot and the first wireless hotspot indicates that they are in the same area, it is determined that the second wireless hotspot is similar to the first wireless hotspot.

In some embodiments of the present application, the location information comprises a hash code of a geographic location. The location information indicating that the second wireless hotspot is in the same area as the first wireless hotspot comprises: the hash code of the geographic location of the first wireless hotspot having an area field identical to that of the second wireless hotspot.

For example, latitude and longitude of a wireless hotspot are converted into a hash code (geohash) through a geohash algorithm. Similar character strings indicate that the wireless hotspots are located closer. Distances between several wireless hotspots may be determined by performing matching on the prefixes of the character strings. Distance accuracy may depend on the length of the geohash code. For example, when the length of geohash base32 code is 8, the accuracy is about 19 meters, and when the length of geohash base32 code length is 9, the accuracy is about 2 meters. Length of code may be selected according to the data.

For example, the interval of the latitude of the earth is [−90, 90], and the latitude of the center point is set as 39.928167. Latitude 39.928167 may be approximated and encoded by the following algorithm:

1) The interval [−90,90] is divided into two intervals [−90,0), [0,90], which are referred as the left interval and the right interval. It may be determined that 39.928167 belongs to the right interval [0,90], and is labeled as 1;

2) Then the interval [0, 90] is divided into two intervals [0, 45), [45, 90]. It is determines that 39.928167 belongs to the left interval [0, 45), and is labeled as 0;

3) The above-mentioned process is recurred and 39.928167 always belongs to a certain interval [a, b]. The interval [a, b] is always getting narrower along with each iteration and is getting closer and closer to 39.928167;

4) If a given latitude x (39.928167) belongs to the left interval, it is labeled as 0; if it belongs to the right interval, it is labeled as 1. A sequence of 1011100 will be generated along with the progress of the algorithm. Length of the sequence is related to the number of divisions of the given interval.

Similarly, the interval of the longitude of the earth is [−180, 180], and the longitude of the center point 116.389550 may be encoded.

According to the above calculation, the code generated based on latitude is 10111 00011, and the code generated based on longitude is 1101001011. Two strings of codes are combined to generate a new string of 11100 11101 00100 01111 by putting longitude in even bits and latitude in odd bits.

Finally, base32 coding is performed with 32 letters of 0 to 9 and b to z (removing a, i, l, o). Firstly, 11100 11101 00100 01111 is converted into decimals as 28, 29, 4, 15, and then the corresponding code in decimal is wx4g, which is the geohash code of the center point.

Similarly, geohash codes of the second wireless hotspot and the first wireless hotspot may also be calculated respectively. For example, if the geohash codes of the second wireless hotspot and the first wireless hotspot are 8 bits respectively, the first six bits of the geohash code of the center point may be set as an area field. If the first six bits of the hash codes of the geographic locations of the second wireless hotspot and the first wireless hotspot, i.e., the area fields are the same, it means that the second wireless hotspot and the first wireless hotspot are in the same area. Length of the area field may be set freely according to actual accuracy requirements.

In some embodiments of the present application, the second wireless hotspot with an identifier similar to that of the first wireless hotspot comprises: an Edit Distance between the identifier of the first wireless hotspot and the identifier of the second wireless hotspot is below a preset similarity threshold.

Edit Distance (Edit Distance) (also referred as Levenshtein distance) refers to the minimum number of editing operations required to convert from one to the other between two strings. The editing operations that are permitted comprise: replacing a character with another, inserting a character, and deleting a character. For example, the edit distance between cafe and coffee may be calculated in the order of cafe→caffe→coffe→coffee. In general, the smaller the edit distance is, the greater the similarity between the two strings is.

For example, for two character strings of str1 and str2, it is assumed that the SSID of the second wireless hotspot is set as str1, and the SSID of the first wireless hotspot is set as str02. The following matrix is generated.

|   |   | s | t | r | 0 | 2 |
|---|---|---|---|---|---|---|
|   | 0 | 1 | 2 | 3 | 4 | 5 |
| s | 1 |   |   |   |   |   |
| t | 2 |   |   |   |   |   |
| r | 3 |   |   |   |   |   |
| l | 4 |   |   |   |   | D[n, m] |

Value of each cell in the matrix is calculated according to the following equation (1):

$$d[i,5j]=\min(d[i-1,j]+1, d[ij-1]+1, d[i-1,j-1]+\text{temp}) \quad (1);$$

in which temp=0 when str1[i]==str2[j]; otherwise, temp=1. i and j are natural numbers and i≥2, j≥2. d[i−1j]+1 means an adding operation, d[i,j−1]+1 means a deleting operation, and d[i−1,j−1]+temp means a replacing operation.

The edit distance may be calculated according to the following equation (2):

$$\text{Edit distance}=1-D[n,m]/\max(\text{string length of str1}, \text{string length of str2}) \quad (2);$$

in which D[n, m] is the last bit of the calculation matrix of the edit distance.

The edit distance between the SSID of the second wireless hotspot and the SSID of the first wireless hotspot is calculated and obtained with the edit distance algorithm. The similarity between two SSIDs is screened by a preset similarity threshold. When the edit distance is below the preset similarity threshold, it is determined that the SSID of the second wireless hotspot is similar to the SSID of the first wireless hotspot. If the second wireless hotspot and the first wireless hotspot are also in the same area, it may be basically determined that the second wireless hotspot is similar to the first wireless hotspot.

In some embodiments of the present application, the above-mentioned step of identifying the type of the second wireless hotspot as the open wireless hotspot with authentication required and adding the second wireless hotspot into the set of hotspots in response to the connection data indicating that authentication is required to connect to the second wireless hotspot comprises:

in response to the connection data indicating that authentication is required to connect to the second wireless hotspot and connection time indicated by connection authentication data being below a preset time threshold, identifying the type of the second wireless hotspot as an open wireless hotspot with authentication required, and adding the second wireless hotspot into the set of hotspots.

In some embodiments, when a network device may generate a data list when collecting connection data of wireless hotspots from a terminal. The data list may comprise an identifier of the wireless hotspot, information indicating that the wireless hotspot requires authentication, and connection time. Open wireless hotspots that require authentication in a recent time period can be screened out by setting a preset time threshold and adding tags of wireless hotspot with authentication required to only the wireless hotspots with connection data generated within the preset time threshold, such that expired data is excluded and freshness and activity of data is kept.

In some embodiments of the present application, after identifying the type of the first wireless hotspot as an open wireless hotspot with authentication required, the method may further comprise the following steps: in response to obtaining connection data from the terminal which is generated based on a connection operation on the first wireless hotspot by the terminal, updating the type of the first wireless hotspot, wherein the connection data is configured to indicate that a password is required to connect to the first wireless hotspot, or that authentication is required to connect to the first wireless hotspot, or that it is allowed to connect to the first wireless hotspot directly, wherein the type of the first wireless hotspot comprises an encrypted wireless hotspot with a password required, an open wireless hotspots with authentication required, or an open wireless hotspot without authentication required.

According to the above-mentioned embodiment, the type of the first wireless hotspot may be updated according to the actually generated connection data, so as to correct the type of the wireless hotspot which has been misidentified or changed. For example, the connection data from the terminal generated by connecting to the first wireless hotspot is collected. The type of the first wireless hotspot is identified based on the connection data. For example, if it is determined, based on analysis on the connection data, that a password is required to connect to the first wireless hotspot, then the first wireless hotspot is identified as an encrypted wireless hotspot with a password required, and the type of the first wireless hotspot is updated accordingly. Alternatively, if it is determined, based on analysis on the connection data, that the first wireless hotspot may be connected directly without authentication or password required, then the wireless hotspot is identified as an open wireless hotspot without authentication required, and the type of the first wireless hotspot is updated accordingly. As another example, if it is determined, based on analysis on the connection data, that authentication is required to connect to the first wireless hotspot, then the first wireless hotspot is identified as an open wireless hotspot with authentication required, and the first wireless hotspot is regarded as a second wireless hotspot and is added into the set of hotspots. It may be corrected through the above steps where a wireless hotspot is misidentified as an open wireless hotspot with authentication required.

In addition, if a type of wireless hotspot actually changes, for example, from a wireless hotspot without identity authentication required into an encrypted wireless hotspot, then the type of wireless hotspot may also be updated according to the above-mentioned method.

According to another aspect of the present application, a computer-readable storage medium storing instructions is provided. The instructions are executed according to the method described in the present application.

According to yet another aspect of the present application, a network device comprising a processor is provided. The processor executes instructions according to the method described in the present application.

For example, the network device obtains information of a first wireless hotspot in response to receiving a type determination request for the first wireless hotspot transmitted by a terminal, wherein the type determination request is configured to request that a type of the first wireless hotspot be provided. The network device searches for a second wireless hotspot which is identical or similar to the first wireless hotspot based on the information of the first wireless hotspot and information of multiple second wireless hotspots in a preset set of hotspots, wherein a type of the second wireless hotspot is an open wireless hotspot with authentication required. The network device identifies the type of the first wireless hotspot as an open wireless hotspot with authentication required in response to locating a second wireless hotspot which is identical or similar to the first wireless hotspot.

Obviously, those skilled in the art can make various modifications and variations to the present application without departing the spirit and scope of the present application. In this way, if these modifications and variations of the present application fall within the scope of the claims of the present application and equivalent technologies thereof, the present application is also intended to encompass these modifications and variations.

It should be noted that the present application can be implemented in software and/or a combination of software and hardware, for example, by using an application specific integrated circuit (ASIC), a general purpose computer, or any other similar hardware device. In one embodiment, the software program of the present application can be executed by a processor to implement the steps or functions described above. Likewise, the software programs (including related data structures) of the present application can be stored in a computer readable storage medium such as a RAM memory, a magnetic or optical drive or a floppy disk and the like. In addition, some of the steps or functions of the present application may be implemented in hardware, for example, as a circuit that cooperates with a processor to perform various steps or functions.

In addition, a portion of the present application can be embodied as a computer program product, such as computer program instructions, when executed by a computer, can invoke or provide a method and/or technical solution in accordance with the present application. The program instructions for invoking the method of the present application may be stored in a fixed or removable storage medium, and/or transmitted by a data stream in a broadcast or other signal carrier medium, and/or stored in a working memory of the computer device in which the program instructions run. Herein, an embodiment in accordance with the present application includes an apparatus including a memory for storing computer program instructions and a processor for executing program instructions, wherein when the computer program instructions are executed by the processor, triggering the apparatus to operate the above mentioned methods and/or technical solutions in accordance with various embodiments of the present application.

For those skilled in the art, it is apparent that the present application is not limited to the details of the above-mentioned exemplary embodiments, and the present application can be implemented in other specific forms without departing the spirit or basic features of the present application. Therefore, the present embodiments are to be considered as illustrative and not restrictive. The scope of the present application is defined by the appended claims rather than the above-mentioned description, and therefore it is intended that all changes which fall within the meaning and range of equivalency of the claims are embraced in the present application. Any reference signs in the claims should not be construed as limiting the claims involved. In addition, it is apparent that the word "comprising" does not exclude other elements or steps, and the singular does not exclude the plural. A plurality of units or means stated in the apparatus claims may also be implemented by one unit or means by means of software or hardware. The terms first and second and the like are used to represent names and do not represent any particular order.

What is claimed is:

1. A method implemented at a network device for identifying a type of a wireless hotspot, comprising:
   in response to receiving a type determination request for a first wireless hotspot, obtaining information of the first wireless hotspot, wherein the type determination request is configured to request that a type of the first wireless hotspot be provided;
   searching for a second wireless hotspot which is identical or similar to the first wireless hotspot based on the information of the first wireless hotspot and information of multiple second wireless hotspots in a preset set of hotspots, wherein a type of the second wireless hotspot is an open wireless hotspot with authentication required; and in response to locating a second wireless hotspot which is identical or similar to the first wireless hotspot, identifying the type of the first wireless hotspot as an open wireless hotspot with authentication required;

wherein the information of the first wireless hotspot and the second wireless hotspot comprises an identifier, location information, and a provider source field of the wireless hotspot;

wherein the type determination request comes from a terminal, and wherein the type determination request comprises an identifier of the first wireless hotspot scanned by the terminal;

the method further comprising: in response to the type of the first wireless hotspot being identified as an open wireless hotspot with authentication required, feeding identification information of the first wireless hotspot and a tag corresponding to the identification information back to the terminal, wherein the tag is configured to indicate that the type of the first wireless hotspot is an open wireless hotspot with authentication required.

2. The method according to claim 1, before obtaining the information of the first wireless hotspot, the method further comprising:

obtaining connection data from a terminal which is generated based on a connection operation on the second wireless hotspot by the terminal; and in response to the connection data indicating that authentication is required to connect to the second wireless hotspot, identifying the type of the second wireless hotspot as the open wireless hotspot with authentication required, and adding the second wireless hotspot into the set of hotspots.

3. The method according to claim 2, wherein the step of in response to the connection data indicating that authentication is required to connect to the second wireless hotspot, identifying the type of the second wireless hotspot as an open wireless hotspot with authentication required, and adding the second wireless hotspot into the set of hotspots comprising:

in response to the connection data indicating that authentication is required to connect to the second wireless hotspot and connection time indicated by the connection data being below a preset time threshold, identifying the type of the second wireless hotspot as an open wireless hotspot with authentication required, and adding the second wireless hotspot into the set of hotspots.

4. The method according to claim 1, wherein the second wireless hotspot similar to the first wireless hotspot comprises:

a second wireless hotspot with an identifier identical to that of the first wireless hotspot and with a provider source field similar to that of the first wireless hotspot;

a second wireless hotspot with an identifier identical to that of the first wireless hotspot and with location information indicating that the second wireless hotspot is in a same area as the first wireless hotspot; or a second wireless hotspot with an identifier similar to that of the first wireless hotspot and with location information indicating that the second wireless hotspot is in a same area as the first wireless hotspot.

5. The method according to claim 4, wherein the location information comprises a hash code of a geographic location, and wherein the location information indicating that the second wireless hotspot is in the same area as the first wireless hotspot comprises:

the hash code of the geographic location of the first wireless hotspot having an area field identical to that of the second wireless hotspot.

6. The method according to claim 4, wherein the second wireless hotspot with an identifier similar to that of the first wireless hotspot comprises: an Edit Distance between the identifier of the first wireless hotspot and the identifier of the second wireless hotspot is below a preset similarity threshold.

7. The method according to claim 1, wherein after identifying the type of the first wireless hotspot as an open wireless hotspot with authentication required, the method further comprising:

in response to obtaining connection data from a terminal which is generated based on a connection operation on the first wireless hotspot by the terminal, updating the type of the first wireless hotspot, wherein the connection data is configured to indicate that a password is required to connect to the first wireless hotspot, or that authentication is required to connect to the first wireless hotspot, or that it is allowed to connect to the first wireless hotspot directly, wherein the type of the first wireless hotspot comprises an encrypted wireless hotspot with a password required, an open wireless hotspot with authentication required, or an open wireless hotspot without authentication required.

8. A non-transitory computer-readable storage medium storing instructions, wherein the instructions, when executed by one or more processors, causing the one or more processors to perform the following operations:

in response to receiving a type determination request for a first wireless hotspot, obtaining information of the first wireless hotspot, wherein the type determination request is configured to request that a type of the first wireless hotspot be provided;

searching for a second wireless hotspot which is identical or similar to the first wireless hotspot based on the information of the first wireless hotspot and information of multiple second wireless hotspots in a preset set of hotspots, wherein a type of the second wireless hotspot is an open wireless hotspot with authentication required; and in response to locating a second wireless hotspot which is identical or similar to the first wireless hotspot, identifying the type of the first wireless hotspot as an open wireless hotspot with authentication required;

wherein the information of the first wireless hotspot and the second wireless hotspot comprises an identifier, location information, and a provider source field of the wireless hotspot;

wherein the type determination request comes from a terminal, and wherein the type determination request comprises an identifier of the first wireless hotspot scanned by the terminal;

the method further comprising: in response to the type of the first wireless hotspot being identified as an open wireless hotspot with authentication required, feeding identification information of the first wireless hotspot and a tag corresponding to the identification information back to the terminal, wherein the tag is configured to indicate that the type of the first wireless hotspot is an open wireless hotspot with authentication required.

9. A network device, wherein comprising:
one or more processors; and
a memory storing computer readable instructions, wherein the computer readable instructions, when executed, cause the processor to perform the following operations:
in response to receiving a type determination request for a first wireless hotspot, obtaining information of the first wireless hotspot, wherein the type determination request is configured to request that a type of the first wireless hotspot be provided;
searching for a second wireless hotspot which is identical or similar to the first wireless hotspot based on the information of the first wireless hotspot and information of multiple second wireless hotspots in a preset set of hotspots, wherein a type of the second wireless hotspot is an open wireless hotspot with authentication required; and
in response to locating a second wireless hotspot which is identical or similar to the first wireless hotspot, identifying the type of the first wireless hotspot as an open wireless hotspot with authentication required;
wherein the information of the first wireless hotspot and the second wireless hotspot comprises an identifier, location information, and a provider source field of the wireless hotspot;
wherein the type determination request comes from a terminal, and wherein the type determination request comprises an identifier of the first wireless hotspot scanned by the terminal;
the method further comprising: in response to the type of the first wireless hotspot being identified as an open wireless hotspot with authentication required, feeding identification information of the first wireless hotspot and a tag corresponding to the identification information back to the terminal, wherein the tag is configured to indicate that the type of the first wireless hotspot is an open wireless hotspot with authentication required.

* * * * *